United States Patent [19]

Cairns

[11] 4,096,095
[45] Jun. 20, 1978

[54] CATALYST OF A COATING ON AN ALLOY SUBSTRATE

[75] Inventor: James Anthony Cairns, Wantage, England

[73] Assignee: United Kingdom Atomic Energy Authority, London, England

[21] Appl. No.: 784,514

[22] Filed: Apr. 4, 1977

[30] Foreign Application Priority Data

Apr. 14, 1976 United Kingdom ............... 15406/76

[51] Int. Cl.$^2$ ..................... B01J 21/04; B01J 23/74; B01J 23/86
[52] U.S. Cl. .................................. 252/465; 252/464; 252/466 J; 252/466 PT; 252/466 B; 423/213.5
[58] Field of Search ................. 252/465, 466 PT, 464, 252/466 J, 466 B; 423/213.2, 213.5

[56] References Cited

U.S. PATENT DOCUMENTS

| | | | |
|---|---|---|---|
| 3,873,472 | 3/1975 | Oshima et al. | 252/466 B |
| 3,907,708 | 9/1975 | Lacroix | 252/466 PT |
| 3,920,583 | 11/1975 | Pugh | 252/465 |
| 3,944,504 | 3/1976 | Ford et al. | 252/466 PT |

*Primary Examiner*—W. J. Shine
*Attorney, Agent, or Firm*—Larson, Taylor and Hinds

[57] ABSTRACT

A catalyst suitable for treating automobile exhaust emissions comprises an Al-containing Fe-base alloy substrate with a protective coating of, e.g., $Al_2O_3$ and $Cr_2O_3$ and a second coating of, e.g., $Al_2O_3$ and a Pt-group metal. The coatings may be applied using sols obtained by dispersing $Al_2O_3$, prepared by vapor phase condensation methods, in water and having appropriate convertible salts dissolved therein, followed by firing.

8 Claims, No Drawings

CATALYST OF A COATING ON AN ALLOY SUBSTRATE

This invention relates to catalysts and the preparation thereof.

There is much interest in the use of catalysts for the treatment of motor vehicle exhaust gases in order to eliminate the noxious constituents thereof, principally carbon monoxide, oxides of nitrogen and hydrocarbons. Such use makes heavy demands on the catalyst, which has to withstand a severe environment and repeated thermal cycling throughout its working lifetime whilst still retaining catalytic effectiveness.

We have now prepared a catalyst which, in certain test results, has exhibited ability to meet the above requirements. Further, we have found that such a catalyst may have application in fields other than the treatment of motor vehicle exhaust gases.

The present invention provides, in a first aspect, a catalyst comprising an Al-containing Fe-base alloy substrate carrying a protective adherent coating comprising a refractory oxide in association with an oxide of an element of the first period of transition elements, with the exception of iron, wherein the transition element oxide is different from the refractory oxide, and a second coating comprising catalytically active material.

The catalysts of the present invention may be capable of catalysing both oxidation and reduction reactions. Thus, they may, for eample, have particular application in the treatment of exhaust fumes from internal combustion engines and also, for example, have applications in hydrogenation, gas burners, isomerisation and ignition systems. Catalysts of the invention have shown particularly outstanding results in their effectiveness in oxidising carbon monoxide and hydrocarbons and in reducing oxides of nitrogen and in maintaining this effectiveness after thermal cycling. Details of tests we have carried out in this respect are contained herein.

The protective adherent coatings of the catalysts are very effective in sealing the surface of the substrate and provide a barrier layer, thereby reducing the tendency of catalyst poisons, which may be present in the substrate, from diffusing through the coating and poisoning the catalytic material.

The alloy substrate may, for example, be an Fe-base alloy containing Al, Cr and Y and it may also be ferritic. A particular example of alloy substrate is the alloy of iron, chromium, aluminium and yttrium with proportions by weight lying in the range of up to 20% chromium, 0.5 to 12% aluminium, up to 3% yttrium, for example 0.1 to 3% yttrium, and the balance iron. The substrate may be used either oxidised or unoxidised, though we prefer that it is used oxidised. When oxidised, for example, by heating in air, the alloy substrate has the property of forming a surface layer which becomes enriched in alumina, as the temperature is increased from 700° C. This surface layer is self-healing if cracked and may provide a key for the protective, adherent coating.

We prefer that the catalytically active material in the second coating is in association with a refractory oxide, additional to the refractory oxide of the protective coating, when we particularly prefer that the associated refractory oxide and transition oxide of the protective coating occupy different sites on the substrate from the associated refractory oxide and catalytically active material of the second coating, so that the catalyst comprises a substrate carrying first entities comprising a transition element oxide and refractory oxide in association, and second entities comprising catalytic material and refractory oxide in association, wherein the first and second entities are separate from one another in the sense that they occupy different sites. A specific example of our particularly preferred catalyst comprises the alloy substrate carrying associated $Al_2O_3$ and $Cr_2O_3$ as the protective coating and associated $Al_2O_3$ and Pt as the second coating, wherein the associated $Al_2O_3/Cr_2O_3$ occupy different sites from the associated $Al_2O_3/Pt$.

We have generally found that any tendency for associated $Al_2O_3/Cr_2O_3$ and associated $Al_2O_3/Pt$ to occupy common sites results in a deterioration in the performance of the catalyst.

We prefer that the refractory oxide in each of the protective and second coatings is of an element whose atomic number does not exceed 40 and we particularly prefer that it is of an element whose atomic number does not exceed 20. Examples of suitable refractory oxides are alumina (which is particularly preferred and which has already been mentioned) and silica. Mixed oxides may also be used.

We also prefer to include a grain growth inhibitor for the refractory oxide in each of the coatings. By "grain growth inhibitor" is meant a substance which inhibits the grain growth of the refractory oxide when the latter is subjected to heat treatment. This is of particular significance in the context of the catalysts of the invention since the inhibitor reduces sintering of the refractory oxide during high temperature use of the catalyst and thereby reduces loss of surface area of the refractory oxide and hence loss of catalytic activity. We have found that the proportions by weight of grain growth inhibitor relative to weight of refractory oxide is significant. Thus, best results have been achieved using around 0.1% (by weight) of inhibitor based on the weight of refractory oxide. Results have, however, been less good using larger proportions by weight of inhibitor (e.g. 0.5% and greater). The grain growth inhibitor is preferably an oxide of a Group IIIA metal or of a rare earth metal. We particularly prefer to use yttria.

The catalytic material used may, for example, be a noble metal and is preferably a platinum group metal, namely osmium, iridium, platinum, palladium, rhodium or ruthenium, when it may, for example, be composed of more than one platinum group metal.

Our preferred catalyst comprises the alloy substrate carrying a protective adherent coating of $Al_2O_3$ as the refractory oxide and $Cr_2O_3$ as the transition metal oxide and a second coating of $Al_2O_3$ as the refractory oxide and a platinum group metal as the catalytically active material. In the protective coating, we prefer that the ratio of Cr atoms to $Al_2O_3$ surface sites is in the range of 1:5 to 2:1, wherein one Cr atom per $Al_2O_3$ surface site is particularly preferred.

We have discussed above the value of associated entities in the protective coating occupying different surface sites from entities in the second coating. This may be achieved by using a refractory oxide in each of the coatings which has been prepared by a vapour phase condensation method. Such methods generally give products of high surface area (referred to as primary-particles), which are capable of dispersion in a liquid medium to give colloidal particles comprising loose aggregate structures of the primary-particles, in which aggregates there are point to point contacts between the primary particles in the structure and spaces within the aggregate structure. Also, the number of point to point contacts is low because of the loose nature of the structure. The morphology of the colloidal particles provides particular advantages in the context of the present invention in that the above mentioned contacts in the aggregate structure present very few opportunities for sintering in the final catalyst, which, if it took place, would reduce surface area and hence catalytic activity.

By a vapour phase condensation method is meant a preparative method which passes through a vapour phase intermediate. Examples of vapour phase condensation methods are flame hydrolysis of volatile halides or alkoxides, evaporation and condensation methods using electron beam, D.C. arc or R.F. plasma heating, or metal oxidation (e.g. of Mg) to give a smoke which is then condensed. A specific example of such a method is the production of alumina by the hydrolytic decomposition of a corresponding volatile halide in a flame to give a product with substantially spherical primary-particles. Oxides produced in this way may, for example, have a particle diameter in the range 4 to 50 nm and a particular example is a finely divided alumina having a particle diameter of ~10 nm and a surface area of ~100 m²/g.

The catalysts of the invention may, if desired, be provided with a third coating which comprises a refractory oxide in association with an oxide of an element of the first period of transition elements, except iron, wherein the transition element oxide is different from the refractory oxide. Thus, the third coating, if provided, has the same general constitution as the first coating. We have found that, in some cases, the third coating may assist the performance of the catalyst.

The catalysts of the invention may be prepared as follows, which constitutes a second aspect of the invention:

(i) contacting an Al-containing Fe-base alloy substrate with a first dispersion in a liquid medium comprising colloidal particles of a refractory oxide and comprising a transition element oxide or precursor thereof, except iron, which is different from the refractory oxide;

(ii) drying and firing to produce a protective coating of the refractory oxide in association with the transition element oxide on the substrate; and (iii) providing catalytically active material on the substrate.

Step (iii) is preferably carried out by contacting the product of step (ii) with a second dispersion in a liquid medium comprising colloidal particles of the refractory oxide, which has been prepared by a vapour phase condensation method and comprising material which is catalytically active or is convertible to catalytically active material, and by converting the convertible material, if present, to catalytically active material. We particularly prefer to use convertible material comprising a water-soluble salt of a platinum group metal in solution in water as the liquid medium. Examples of such salts are chloroplatinic acid, $Pt(NH_3)_4Cl_2$ and rhodium trichloride which are readily converted to the metal by, for example, chemical or thermal reduction. The conversion of convertible material, if present, to catalytically active material may be effected by firing, provided that the convertible material is decomposable to catalytically active material under such conditions. However, we prefer to effect the conversion by reduction using a soluble carbonisable polymer. 'Soluble' means soluble in the liquid medium, and the polymer may be provided in solution in the second dispersion. On firing, the polymer is initially carbonised and then reduction of convertible material to catalytic material is effected by carbon and/or carbon monoxide. For such a mode to be effective, the convertible material must, of course, be capable of being reduced in this way. A preferred example of such a polymer is polyvinyl alcohol (often referred to as PVA).

If a third layer is desired in the present method, the product of step (iii) may be contacted with a third dispersion in a liquid medium comprising colloidal particles of a refractory oxide and comprising a transition element oxide or precursor thereof, except iron, which is different from the refractory oxide, followed by drying and firing.

In each dispersion the colloidal particles dispersed in the liquid medium, which is most conveniently water, constitute a sol. The term "refractory oxide," when applied to the colloidal particles, also includes precursors thereof which are convertible to the oxide as such during subsequent firing, e.g., as in step (ii). Examples of such precursors are nitrate-stabilised aluminium oxyhydroxide and aluminium chlorohydrate, which are alumina precursors. Likewise, the term "transition element oxide" when applied to the first and third dispersions, also includes precursors thereof which are convertible to the oxide as such during subsequent firing, for example convertible salts which are soluble in the liquid medium. A specific example of such a precursor is chromium (III) nitrate which, when the liquid medium is water, may be provided in solution in the first and/or third dispersions and converted to chromium (III) oxide during subsequent firing.

A grain growth inhibitor, if required, may also be provided in each of the dispersions, wherein it may be an inhibitor as such or a precursor thereof which is convertible to the inhibitor during subsequent firing. It may be a compound of a Group IIIA metal or of a rare earth metal, for example a salt thereof which is soluble in the liquid medium, and which is provided in solution therein. Such salts may associate in some way with the colloidal particles in the dispersion, possibly by electrostatic attraction, to give what may be termed a "mixed sol". Alternatively, the inhibitor, if used in any of the dispersions, may be in the form of colloidal particles dispersed in the liquid medium, in which case it must be different from the refractory oxide.

A preferred way of preparing the first and third dispersions is to mix a sol of the refractory oxide (e.g. an alumina aquasol) with a solution of a salt of the transition element (such as chromium nitrate).

A further preferment is that the dispersions of the colloidal particles have been prepared by dispersing, in the liquid medium, a small particle size, high surface area form of the oxide obtained by a vapour phase condensation method, such as flame hydrolysis of a halide corresponding to the oxide, and which are previously described herein.

The viscosity of the dispersions may be controlled to facilitate carrying out the transfer of material in the contacting steps. In this connection, we have found that lowering of the pH of a dispersion to some extent lowers its viscosity to facilitate the above mentioned transfer.

The alloy substrate used may be in the form of a powder, a sheet, including a combination of plane and corrugated sheets as in a honeycomb structure, fibre, or a gauze. Step (i) may, for example, be carried out simply by immersing the substrate in the first dispersion and then removing it therefrom. This procedure is particularly appropriate when the substrate is in the form of a sheet. The drying in step (ii) converts the sol to the corresponding gel form.

The various firing steps may suitably be carried out at a temperature within the range from 200° C to 850° C, preferably 400° C. The purpose of the firing may, for example, be for converting the gel of the refractory oxide to the corresponding anhydrous form, for improving adhesion of the refractory oxide to the substrate, or for converting any precursors of refractory oxides, transition metal oxides and inhibitors to refractory oxides, transition metal oxides and inhibitors as such, in addition to assisting conversion of convertible material to catalytically active material, as already described.

The invention will now be particularly described in Examples 1 to 3 below. Experiment A below is for comparative purposes only and is not an example of the invention. The "Fecralloy" (Registered Table Mark) alloy used in the examples contained up to 20% Cr, 0.5 to 12% Al, 0.1 to 3% Y, and the balance Fe.

EXAMPLE 1

(a) Preparation of Catalyst Support

Finely powdered alumina, as prepared by a vapour phase condensation method and having a small particle size (~10 nm) and high surface area (~100 m$^2$/g) was dispersed in water to give a 9% by weight Al$_2$O$_3$ aquasol. Aqueous yttrium nitrate solution was added to the sol to give 0.1% by weight of Y$_2$O$_3$ equivalent. 120 ml of a 50% by weight aqueous solution of Cr(NO$_3$)$_3$.9H$_2$O were then added to one litre of the sol to give a "mixed sol".

A sample of "Fecralloy" alloy of thickness 6.25 × 10$^{-3}$cm, which has been previously heated in air for 8-12 hours at 1000° C to form an alumina rich surface layer, was immersed in a sample of the above mixed sol, removed, dried and fired in air at 850° c for 15 minutes.

The firing converted the yttrium and chromium nitrates to the corresponding oxides and gave a catalyst support comprising "Fecralloy" alloy carrying an adherent coating of Cr$_2$O$_3$ + Al$_2$O$_3$ + Y$_2$O$_3$.

(b) Preparation of Catalyst

A 9% by weight Al$_2$O$_3$ aquasol was prepared as above. Aqueous yttrium nitrate solution was added to the sol to give 0.1% by weight of Y$_2$O$_3$ equivalent. 15 g of H$_2$PtCl$_6$.6H$_2$O were then dissolved in 1 l of the sol and 2 ml of a 20% by weight solution of PVA added. A sample of the catalyst support prepared above was immersed in this sol, removed, dried and fired in air at 850° C for 15 minutes. The firing carbonised the PVA, and the H$_2$PtCl$_6$ was reduced to Pt which appeared as a dark sheen.

The catalyst so-produced was further treated by immersing in a sample of the mixed sol from (a) above, removing, drying and firing in air at 850° C for 15 minutes. The provision of layers in the final catalyst may therefore be represented as

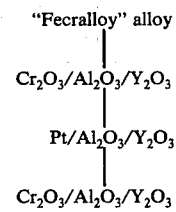

(c) Tests on Catalyst

The catalyst was tested under conditions designed to simulate the high gaseous throughputs which obtain in a vehicle exhaust environment.

A sample of the catalyst measuring 2 × 2 cm and of thickness 6.25.10$^{-3}$ cm was mounted in a silica tube and subjected to 50 μl slugs of either carbon monoxide/oxygen or propane/oxygen or nitric oxide/carbon monoxide, flowing at a velocity of 50 ml/min, i.e. the space velocity of the gases was equivalent to the volume of the catalyst being displaced 120,000 times per hour, which is near to the upper limit of a typical exhaust system. The temperature required to cause complete conversion of the noxious components was noted. The catalyst was then subjected to an acelerated ageing procedure by being heated in air at 1,000° C for 8 hours, and the above measurements repeated. The results appear in Table 1 below.

EXAMPLE 2

The procedure of Example 1 was repeated with the exception that the firing temperature was 400° C at each stage. The test results, together with the test results for Example 1, are summarised in Table 1 below.

TABLE I

| | Complete Conversion Temperatures at a Space Velocity of 120,000 Displacements per Hour | | | | | |
|---|---|---|---|---|---|---|
| | Nitric Oxide Reduction by Carbon Monoxide | | Propane Oxidation | | Carbon Monoxide Oxidation | |
| Example | New Catalyst | After Heating at 1000° in air for 8 hrs | New Catalyst | After Heating at 1000° in air for 8 hrs | New Catalyst | After Heating at 1000° C in air for 8 hrs |
| 1 | 400° C | 430° C | 400° C | 400° C | 210° C | 240° C |
| 2 | 320° C | 390° C | 350° C | 350° C | 180° C | 220° C |

The above results show that the catalysts tested were very effective in the catalysis of the three specified reactions and that this effectiveness was only slightly reduced (in the case of propane oxidation, not at all) after carrying out the specified thermal treatment. The results also show that carrying out the firing at 400° C rather than 850° C may be beneficial, particularly in the case of NO reduction by CO.

EXAMPLE 3

Preparation of Catalyst

A "Fecralloy" alloy substrate was constructed from 6 inches wide strips, one strip having corrugations 0.009 inch deep, and the other having corrugations 0.040 inch deep superimposed on previously applied 0.009 inch deep corrugations. These strips were placed one on the other and rolled up to form a substrate, of length 6 inches and diameter 4.1 inches. The substrate was then oxidised in air at 1000° C for 2 hours, instead of 8–12 hours pretreatment. A catalyst was applied to each layer as follows:

(a) The substrate was immersed in the sol described in Example 1 (a), then removed, dried and fired at 400° C in air for 15 minutes.

The substrate was then immersed in a 13.5 % by weight $Al_2O_3$ aquasol, made from the same finely divided alumina as described in Example 1, and containing aqueous yttrium nitrate solution, added to the sol to give 0.1% by weight $Y_2O_2$ equivalent, then removed, dried and fired at 850° C in air for 15 minutes.

(b) The substrate was then immersed in a sample of a sol as used in (a) above but to which had been added 15 g of $H_2PtCl_6.6H_2O$ per litre and 2 ml of a 20% by weight solution of PVA per litre. The substrate was then removed, dried and fired at 850° C in air for 15 minutes. The final catalyst which may be represented as

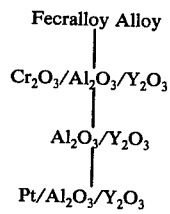

was found to have a platinum loading of 22 g/cu ft.

EXPERIMENT A

Preparation of Catalyst

A substrate as used in Example 3 was treated by (a) Dipping in a 13.5% by weight $Al_2O_3$ aqusol, made from the same finely divided alumina as described in Example 1, and containing aqueous yttrium nitrate solution, added to the sol to give 0.1% by weight $Y_2O_3$ equivalent. The substrate was then removed, dried, and fired at 850° C in air for 15 minutes.

(b) To a sample of the above sol was added 15 g $H_2PtCl_6.6H_2O$ per litre and 2 ml of a 20% by weight solution of PVA per litre. The substrate was immersed in this, then removed, dried and fired at 850° C in air for 15 minutes.

The final catalyst which may be represented as

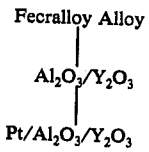

was found to have a platinum loading of 22 g/cu ft.

Tests on Catalysts of Example 3 and Experiment A

It will be noted that the substrate used in Example 3 was treated in the same way as that used in Experiment A and had the same platinum loading, with the exception that the substrate in Example 3 had a prior $Cr_2O_3./Al_2O_3/Y_2O_3$ barrier layer.

Each catalyst was tested as follows. The catalyst was mounted on the exhaust system of a 2 litre petrol engine (Triumph Dolomite), running on low lead (0.034 gm/U.S. gal) fuel. The engine was cycled between idle and 70 MPH road load at 1 minute intervals for 3 hours, using a procedure described by Haslett, viz., "A Technique for Endurance Testing of Oxidation Catalytic Reactors", Automotive Engineering Congress, Detroit, MI 1974.

The catalyst were then removed, mounted on the exhaust system of a 1.8 liter Austin Marina car, and used to control the exhaust emissions over a standard U.S.A. Environmental Protection Agency driving cycle, the emissions being measured by a Constant Volume Sampling (C.V.S.) Technique. The results for each catalyst are summarised below, where the figures are in g/mile.

| EXPERIMENT A CATALYST | | EXAMPLE 3 CATALYST | |
|---|---|---|---|
| Hydrocarbons | Carbon Monoxide | Hydrocarbons | Carbon Monoxide |
| 0.16 | 0.92 | 0.06 | 0.71 |

| EMISSION CHARACTERISTIC OF TEST VEHICLE (WITHOUT CATALYST) | |
|---|---|
| Hydrocarbons | Carbon Monoxide |
| 0.89 | 12.79 |

These results illustrate the improvement in durability obtained by the use of the chromium oxide/alumina/yttria coating of the invention.

This benficial coating has also been applied to "Fecralloy" alloy, preoxidised at temperatures down to 400° C for times as short as 15 minutes.

I claim:

1. A catalyst comprising an Al-containing Fe-base alloy substrate carrying a protective adherent coating comprising a refractory oxide in association with an oxide of an element of the first period of transition elements of the Periodic Table, except iron, wherein the transition element oxide is different from the refractory oxide, and a second coating comprising catalytically active material for treating automotive exhaust gases in association with a refractory oxide wherein said coating is carried by said protective coating.

2. A catalyst according to claim 1 wherein the alloy contains proportions by weight of up to 20% Cr, 0.5 to 12% Al, up to 3% yttrium and the balance iron, the protective coating comprises $Al_2O_3$ and $Cr_2O_3$ and the second coating comprises $Al_2O_3$ and a platinum group metal.

3. A catalyst according to claim 2 wherein, in the protective coating, the ratio of Cr atoms to $Al_2O_3$ surface sites is in the range of 1:5 to 2:1.

4. A catalyst according to claim 3 wherein the protective coating and the second coating each have $Y_2O_3$ associated therewith as a grain growth inhibitor for the $Al_2O_3$.

5. A method of preparing a catalyst comprising the steps of (i) contacting an Al-containing Fe-base alloy substrate with a first dispersion in a liquid medium comprising colloidal particles of a refractory oxide and comprising an oxide of an element of the first period of the Periodic Table transition elements except iron, which is different from the refractory oxide;

(ii) drying and firing to produce a protective coating of the refractory oxide in association with the transition element oxide on the substrate; and (iii) contacting the product of step (ii) with a second dispersion in a liquid medium comprising colloidal particles of a refractory oxide, which has been prepared by a vapour phase condensation method, and comprising material which is catalytically active or is convertible to catalytically active material, and by converting the convertible material, if present, to catalytically active material.

6. A method of preparing a catalyst comprising the steps of (i) contacting a substrate of an Fe-base alloy containing proportions by weight of up to 20% Cr, 0.5 to 12% Al, up to 3% Y and the balance Fe with a first aqueous dispersion comprising colloidal particles of $Al_2O_3$ and a water-soluble salt of Cr dissolved therein, which salt is decomposable to $Cr_2O_3$;

(ii) drying and firing to produce a protective coating of $Al_2O_3$ in association with $Cr_2O_3$ on the substrate; and (iii) contacting the product of step (ii) with a second aqueous dispersion comprising colloidal particles of $Al_2O_3$, which $Al_2O_3$ has been prepared by a vapour phase condensation method, and comprising a water-soluble salt of a Pt group metal dissolved therein, which salt is convertible to a Pt group metal, and converting the salt to the Pt group metal.

7. A method according to claim 6 wherein the colloidal particles in each of the dispersions have been prepared by dispersing substantially spherical primary-particles of $Al_2O_3$, made by a vapour phase condensation method, in water.

8. A method according to claim 6 wherein each of the dispersions has dissolved therein a water-soluble salt of yttrium, which salt is convertible to $Y_2O_3$ on firing.

* * * * *